United States Patent [19]

Utner

[11] 3,864,798

[45] Feb. 11, 1975

[54] METHOD OF ENCAPSULATING END-CONTACTED ELECTRICAL COMPONENTS

[75] Inventor: Ferdinand Utner, Regensburg, Germany

[73] Assignee: Siemens Aktiengesellschaft, Berlin, & Munich, Germany

[22] Filed: Aug. 22, 1973

[21] Appl. No.: 390,393

[30] Foreign Application Priority Data
Sept. 1, 1972 Germany.............................. 2243203

[52] U.S. Cl.................... 29/25.42, 29/613, 29/616, 117/21, 117/DIG. 6, 174/52 PE, 317/260, 338/257
[51] Int. Cl............................................. H01g 13/00
[58] Field of Search .......... 29/25.42, 610, 613, 616, 29/527.4; 117/DIG. 6, 21; 338/257, 256; 317/260, 261; 174/52 PE

[56] References Cited
UNITED STATES PATENTS

| | | | |
|---|---|---|---|
| 2,392,311 | 1/1946 | Christopher | 174/52 PE |
| 2,970,182 | 1/1961 | Miquelis | 174/52 PE |
| 3,111,642 | 11/1963 | Goodwin et al. | 117/21 X |
| 3,167,454 | 1/1965 | Tompson | 117/DIG. 6 |
| 3,310,431 | 3/1967 | Loose | 117/21 X |
| 3,383,233 | 5/1968 | Curcio | 117/21 X |
| 3,579,770 | 5/1971 | O'Mara et al. | 29/25.42 |

*Primary Examiner*—Carl E. Hall
*Attorney, Agent, or Firm*—Hill, Gross, Simpson, Van Santen, Steadman, Chiara & Simpson

[57] ABSTRACT

A method of encapsulating an end contacted electrical component, provided with connecting wires, with a continuous layer of synthetic resin material serving as insulation and protection, by a vortex sintering process by attaching a metal foil to the component or wrapping the component with a metal foil or a metalized synthetic resin foil with the metalization facing outwardly, in such a manner that no electrical contact is formed between the end contacts and thereafter placing the wrapped component in a reservoir containing a suspended synthetic resin powder maintained in a turbulent motion and heating the component indirectly by inductance using high frequency current so as to fuse or sinter resin powder deposited on the component to form the synthetic resin layer, the heating being conducted only after the component has been placed in the reservoir.

8 Claims, 5 Drawing Figures

METHOD OF ENCAPSULATING END-CONTACTED ELECTRICAL COMPONENTS

BACKGROUND OF THE INVENTION

1. Field of the Invention

This invention relates to a process for the encapsulation of an end contacted electrical component having connecting wires, in particular an electrical wound or foil capacitor, with an overall plastic layer which serves both as insulation and as a protection against humidity, and is produced by a vortex sintering process.

2. Description of the Prior Art

A process for the encapsulation of electrical capacitors is known from the German Pat. No. 1,217,471 in which the capacitors are surrounded with a plastic layer by means of a vortex sintering process. In this known process, the entire component is first heated and subsequently introduced into cold turbulently suspended powder to be sintered, i.e., the heating takes place at a point which is more or less remote from the powder bath. Because of this remote heating technique, and because of the consequent heat lost during transport to the powder bath and immersion in the bath, the capacitor to be encapsulated has to be heated substantially more strongly than is necessary for the actual fusing of the resin layer. This difference in temperature or heat is the larger, the smaller the component to be encapsulated. Small, temperature sensitive components cannot therefore be encapsulated by means of this known process as is well understood, for example, the foil packs of layer capacitors burst when they are raised to the high temperatures necessary for this kind of process.

Moreover, with the usual procedural sequence of heating (preheating of the winding), cooling (by immersion into the turbulent resin powder), and heating (to form a smooth layer and hardening and curing of the resin layer so formed), used when encapsulating wound or foil capacitors with resin powder by means of the vortex sintering process, the air which is present in the winding in the case of wound capacitors is forced out, then drawn in, and again forced out, so that air holes can form, parrticularly at the ends of the winding, which do not seal even when the procedure is repeated several times.

SUMMARY OF THE INVENTION

It is therefore an object of the present invention to provide a method of encapsulating electrical components which can be utilized for particularly temperature-sensitive components, such as, for example, foil capacitors, and by the use of which the abovedescribed difficulties, such as, for example, the tendency to form air bubbles in the covering of wound or foil capacitors, can be obviated, or at least reduced.

According to the invention there is provided a method of encapsulating an end contacted electrical component which has connecting wire, with a continuous layer of synthetic resin material serving as insulation and protection, by the vortex sintering process, comprising the steps of attaching a metal foil to the component, or wrapping the component with a metal foil or a metalized synthetic resin foil with the metalization facing outwardly, in such a manner that no electrical contact is formed between the end contacts, thereafter placing the wrapped component in a reservoir containing a suspended synthetic resin powder maintained in turbulent motion, and heating the component indirectly by induction using high frequency current so as to fuse or sinter resin powder deposited on the component to form the resin layer, the heating being effected only after the component has been placed in the reservoir.

By wrapping the component with a metalfoil or a metalized resin foil and using inductive indirect heating, the advantage is achieved that substantially only the external metal areas of the foil and the contacted ends of the components are heated so that the deposited resin powder can be fused thereto on all sides. Moreover, unnecessary thermal stress of the electrical component itself is avoided because the heating is localized on the outermost portions of the component in the case of the metallic wrapped component and in any event does not take place earlier than the time at which the component is within the reserevoir containing the suspended powder. It is, therefore, not necessary to heat the component to an excessive temperature since there is no transport and no transportation path with its attendant thermal losses. Since the temperature shock caused by immersion of the hot component into the cold suspended resin powder does not occur, the component remains at the same temperature and no air holes can form in the coating. The hardening and smoothing of the resin material fused on in the vortex sintering reservoir is conveniently also effected by indirect high frequency induction heating in which case the thermal losses of the electrical component, which may occur between the withdrawal of the component from the reservoir and the hardening and smoothing procedure, can be avoided by the use of indirect thermal radiators, e.g., heating coils or infra-red radiators.

BRIEF DESCRIPTION OF THE DRAWING

Other objects, features and advantages of the invention, its organization, construction and operation will be best understood from the following detailed description taken in conjunction with the accompanying drawing, in which.

DESCRIPTION OF THE PREFERRED EMBODIMENT

Figure 1:
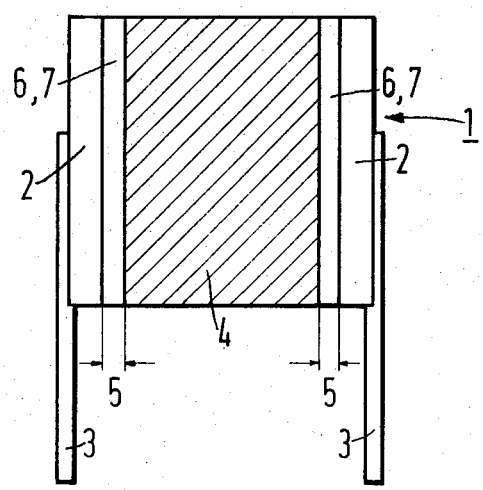
FIG. 1 is a schematic elevational view of a stack capacitor during encapsulation in accordance with the invention.

In FIG. 1, a stack or layer capacitor 1 is shown which is end contacted by treatment in accordance with the "Schoop" process. The capacitor 1 is provided with connecting wires 3 which are attached respectively to Schoop areas 2. A metal foil or metalized plastic foil 4 is attached to each side of the capacitor, the foil illustrated with cross hatching on the drawing. The width of the foil 4 is selected so that between the foil 4 and each of the end contacted areas 2, a pair of insulating gaps 5 are formed. The width of the gaps is such that, during the encapsulation process, resin bridges form between the heated foil 4 and the heated Schoop areas 2, whereby the entire component is enclosed on all sides.

Figure 2:
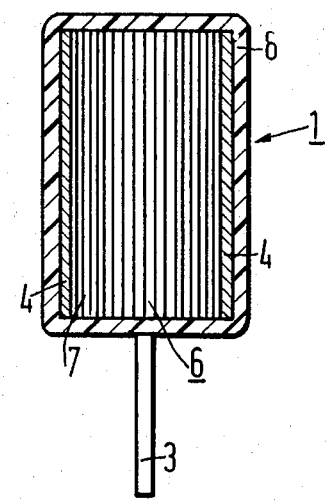
FIG. 2 is an end sectional view through the stack of FIG. 1 after encapsulation.

FIG. 2 illustrates in a sectional view, the finished encapsulated stack capacitor 1. Over the metalized dielectric foils 6 a few layers of a cover foil 7 is arranged. Outside, there is the metal foil or metalized plastic foil 4. The entire capacitor 1 is now provided with a coating of synthetic resin 8, in the vortex sintering process described above.

Figure 3:
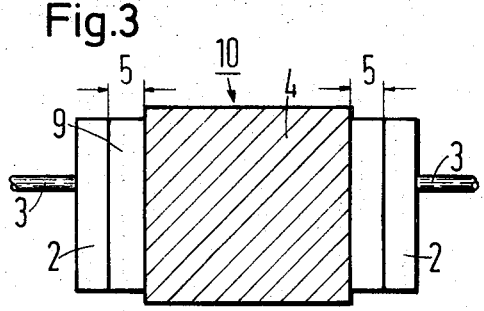
FIg. 3 is a schematic side view of a wound capacitor during encapsulation in accordance with the invention.

FIG. 3 illustrates a wound foil capacitor 10 which is provided with Schoop areas 2 at its respective ends. Contacting wires 3 can be attached radially as well as axially, as shown, to the Schoop areas 2. A metal foil or metalized plastic foil is wrapped around the capacitor roll 9 in such a way that insulation gaps 5 are left as before and, therefore, no electrical contact can occur between the Schoop areas 2.

Figure 4:
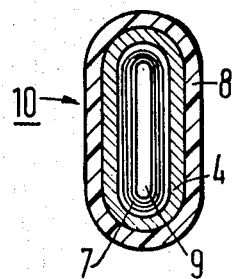
FIG. 4 is an end sectional view through the wound capacitor of FIG. 3 after encapsulation.

FIG. 4 illustrates, in a sectional view, the finished encapsulated wound capacitor 10 of FIG. 3. A few layers of a cover foil 7 are wrapped about the roll 9. Over this cover foil there is the metal foil or metalized plastic foil 4. The entire capacitor 10 is now covered with a synthetic resin layer 8.

Figure 5:
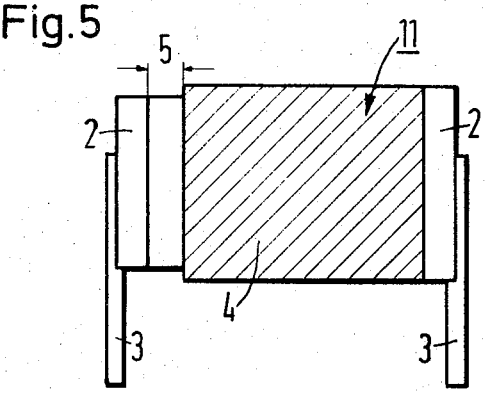
FIG. 5 is a schematic side view of a further form of wound capacitor during encapsulation in accordance with the invention.

FIG. 5 illustrates a stack capacitor or roll capacitor 11, in which the metal foil or the metalized plastic foil 4 is attached or wrapped-on in such a way that only one insulation gap 5 is left.

In all the examplary embodiments of capacitors illustrated on the drawing, the layer 8 is formed by the vortex sintering process, the component with the foil 4 in place thereon being placed unheated in a reservoir containing turbulently suspended resonant powder and being heated in the reservoir indirectly by H.F. induction heating.

Although I have described my invention by reference to a particular illustrative embodiment thereof and exemplary components which may advantaegously be subjected to the practice of the invention, may changes and modifications of my method may become readily apparent to those skilled in the art without departing from the spirit and scope of my invention. I therefore intend to include within the patent warranted hereon all such changes and modifications as may reasonably and properly be included within the scope of my contribution to the art.

I claim:

1. A method of encapsulating an electrical component with a continuous layer of synthetic resin material which serves as insulation and protection, the component including end contacts, comprising the steps of: attaching a metal foil to the component so that there is electrical discontinuity between the end contacts while contemporaneously electrically insulating the metal foil from the entire component; placing the component in an environment of synthetic resin powder; and heating the comonent while in the synthetic resin powder environment to sinter resin powder adhering to the component.

2. The method of claim 1, wherein the step of heating is more particularly defined as indirectly heating the component by induction heating with a high frequency current.

3. The method of claim 1, wherein the step of attaching a metal foil is further defined as wrapping a metal foil about the component.

4. The method of claim 1, wherein the step of attaching a metal foil is further defined as wrapping a metalized synthetic resin layer about the component with the metalization facing outwardly.

5. The method of claim 1, wherein the step of placing the component in an environment of synthetic resin powder is further defined by the steps of providing a turbulent suspension of synthetic resin powder in a reservoir and placing the component within the reservoir.

6. The method of claim 1, wherein the step of attaching a metal foil is further defined by the step of positioning a metal foil spaced from at least one of the end contacts to provide a gap.

7. The method of claim 1, wherein the step of attaching a metal foil is further defined by the step of positioning the metal foil between and spaced from the end contacts of the component.

8. A method of encapsulating an electrical component with a continuous layer of synthetic resin material which serves as insulation and protection, the component including end contacts, comprising the steps of: wrapping the component with a metalized synthetic resin layer, while electrically insulating the entire component from the metalization by positioning the layer with the metalization facing outwardly and spaced from at least one of the end contacts; placing the wrapped component within a reservoir containing turbulently suspended synthetic resin powder; and heating the wrapped component only after the placement thereof within the reservoir to sinter on synthetic resin powder adhering to the component.

* * * * *